US 8,494,972 B2

(12) United States Patent
Wiese

(10) Patent No.: US 8,494,972 B2
(45) Date of Patent: Jul. 23, 2013

(54) VALUATION USING CREDIT SCORE

(75) Inventor: Steven Paul Wiese, Farmington, MI (US)

(73) Assignee: Pythalis Suite Data KG, LLC, Wilmington, DE (US)

( * ) Notice: Subject to any disclaimer, the term of this patent is extended or adjusted under 35 U.S.C. 154(b) by 748 days.

(21) Appl. No.: 12/605,823

(22) Filed: Oct. 26, 2009

(65) Prior Publication Data

US 2010/0049539 A1 Feb. 25, 2010

Related U.S. Application Data

(63) Continuation-in-part of application No. 12/106,756, filed on Apr. 21, 2008, now Pat. No. 7,653,555.

(51) Int. Cl.
*G06Q 10/00* (2012.01)
*G06Q 50/00* (2012.01)

(52) U.S. Cl.
USPC .......................................... 705/306; 705/313

(58) Field of Classification Search
USPC ................................................. 705/313, 306
See application file for complete search history.

(56) References Cited

U.S. PATENT DOCUMENTS

| | | | |
|---|---|---|---|
| 5,414,621 A | 5/1995 | Hough | |
| 5,857,174 A | 1/1999 | Dugan | |
| 7,289,965 B1 | 10/2007 | Bradley et al. | |
| 8,027,850 B1 * | 9/2011 | Pietrzak | 705/4 |
| 2002/0032585 A1 | 3/2002 | Keyes | |
| 2003/0110112 A1 | 6/2003 | Johnson et al. | |
| 2006/0085207 A1 | 4/2006 | Carey et al. | |
| 2008/0004893 A1 | 1/2008 | Graboske | |

OTHER PUBLICATIONS

Pulliam Weston, Liz, "Insurers Keep a Secret History of Your Home," www.articles.moneycentral.msn.com.Insurance/InsureYourHome/Insure. . . , Feb. 1, 2008.
Decker, Bobbi, "Property Insurance".
Gale Group & Trade Industry DB, "Refining Valuation Models: property-valuation models have a ways to go before their full contribution to the lending process can be realized," Aug. 2005.
Nattagh et al., "Refining Valuation Models: property-valuation models have a ways to go before their full contribution to the lending process can be realized," Aug. 2005.
Property Listings from MRIS, 2007-2008, Metropolitan Regional Information Systems, Inc.
S&P Revises Method to Assess House Price Volatility, Apr. 1, 2002, PR Newswire.
Baker, Stephen, "Want a Loan? Act Responsibly," Business Week Information Technology, Oct. 24, 2008.
Kulakowski et al., "DBRS Rating Criteria for U.S. Residential Mortgage-Backed Securities: Loss Severity," Dominion Bond Rating Service, Jul. 2005.

(Continued)

*Primary Examiner* — Jami A Plucinski
*Assistant Examiner* — Shaun Sensenig
(74) *Attorney, Agent, or Firm* — Turocy & Watson, LLP

(57) ABSTRACT

A method of appraising the value of a property based on obtaining a credit score of an owner of a property and assigning an ownership responsibility indicator to the property. The ownership responsibility indicator provides insight into the condition of the property without performing a complete inspection. A more accurate value of the property can then be determined.

20 Claims, 6 Drawing Sheets

OTHER PUBLICATIONS

ABI, "Valuation of Texas LIHTC Apartments Restricted by Land Use Restriction Agreements," Appraisal Journal v73n1, pp. 47-55, Winter 2005.

Banton, Stan H., "The growing debate over appraisal technology," Mortgage Banking, 63,1, 123 (4) Oct. 2002.

The Gale Group, "Business & Industry," Jul. 1994-2008/Apr. 04.

The Gale Group, "Falling Mortgage Dominos: Like its subprime sibling, the Alt-A Mortgage mart sees rise in late payments and defaults," Jan. 1, 2008.

Hershkowitz, Brian, "A New Vision for Valuation: What if there was a simple FICO-like score for property valuations?" Mortgage Banking, 65, 1, 138(6), Oct. 2004.

\* cited by examiner

Fig-5

|  | Subject | Comp. 1 | Comp. 2 | Comp. 3 | Comp. 4 | Comp. 5 |
|---|---|---|---|---|---|---|
| Style | Ranch | Ranch | Ranch | Ranch | Ranch | Ranch |
| Square Ft. | 1000 | 1000 | 1000 | 1000 | 1000 | 1000 |
| Age (yr) | 10 | 10 | 10 | 10 | 10 | 10 |
| ORI | High | Low | Medium | High | High | High |
| Sale Price ($) | ? | 90,000 | 100,000 | 110,000 | 110,000 | 110,000 |
| Lot Size | Average | Average | Average | Average | Average | Average |
| Location | Sub. | Sub. | Sub. | Sub. | Sub. | Sub. |

Subject Property Value: $110,000

Fig-6

|  | Appraisal 1 | Appraisal 2 | Appraisal 3 | Appraisal 4 | Appraisal 5 |
|---|---|---|---|---|---|
| Initial Value ($) | 80,000 | 150,000 (130,000 to 170,000) | 200,000 (170,000 to 230,000) | 140,000 to 160,000 | 80,000 |
| ORI | Low | High | Low | Low | High |
| Price Factor | 0.9 | 1.1 | 0.9 | 0.9 | 1.05 - 1.1 |
| Appraisal Value ($) | 72,000 | 165,000 (143,000 to 187,000) | 180,000 (170,000 to 230,000) | 126,000 to 144,000 | 84,000 - 88,000 |

| | Subject | Comp. 1 | Comp. 2 | Comp. 3 | Comp. 4 | Comp. 5 |
|---|---|---|---|---|---|---|
| Sale Price ($) | N/A | 200,000 | 240,000 | 340,000 | 215,000 | 210,000 |
| Style | Colonial | Ranch (+5k) | Ranch (+5k) | Colonial | Bi-Level (+5k) | Ranch (+5k) |
| Square Ft. | 2100 | 1800 (+45k) | 2000 (+15k) | 2350 (-37.5k) | 2050 (+7.5) | 1950 (22.5k) |
| Age (yr) | 7.5 | 15 (+15k) | 5 (-5k) | 2.5 (-5k) | 10 (+5) | 10 (+5k) |
| ORI | High | Low (+20k) | Medium (+10k) | High | Low (+20k) | High |
| Lot Size | Average | Large (-20k) | Average | Large (-20k) | Average | Small (+20k) |
| Location | Sub. | Sub. | Sub. | Sub. | Sub. | Sub. |
| Adjusted Price | N/A | 265,000 | 265,000 | 277,500 | 252,500 | 262,500 |

Subject Property Value Based on All Comps: $252,500 to $277,500
Subject Property Value Based on Comps with Similar ORI: $262,500 to $277,500

*Fig-7*

VALUATION USING CREDIT SCORE

CROSS-REFERENCE TO RELATED APPLICATIONS

This application is a continuation-in-part of U.S. patent application Ser. No. 12/106,756, filed on Apr. 21, 2008 now U.S. Pat. No. 7,653,555.

BACKGROUND OF THE INVENTION

The present invention relates generally to computer systems and more particularly a computer system for determining a value of a property.

Valuation products such as automated valuation models (AVM), drive by appraisals, desk reviews, and others that do not include an inspection have a significant short fall. They have no way of determining a condition of the property. This is less of a problem with new structures, however, as a structure ages, its condition is often the most important factor when comparing it to other similar structures. Unless a complete inspection is performed, lenders, insurance companies, or others concerned with the value of the property are unable to determine its condition.

SUMMARY OF THE INVENTION

The present invention provides a method and computer system for obtaining information regarding a condition of a property and assigning a value to the property without performing a complete inspection.

Preferably, the computer system of the present invention includes a database for accessing information to determine a value range or a specific value within a range for the property and to obtain a credit score for an owner of the property. From the owner's credit score, an ownership responsibility indicator is determined for the property. The ownership responsibility indicator provides insight into the condition of the property. The condition determined by the ownership responsibility indicator generates a more accurate value or range of values to be assigned to the property.

Another example method includes a computer system obtaining a credit score for an owner of a property and at least one previous owner of the property from a database. From the credit scores of the current owner and the at least one previous owner, an ownership responsibility indicator is determined for the property. The condition determined by the ownership responsibility indicator based on the credit scores of the current owner and previous owner generates a more accurate value or range of values to be assigned to the property by the computer.

Another example method includes a computer system obtaining a credit score of an owner of a property from a database and defining an ownership responsibility indicator for the property. The computer system also obtains a credit score for each owner of a plurality of comparable property sold and defines an ownership responsibility indicator for the comparable property based on the credit score of its owner. A value is assigned to the property based on matching the ownership responsibility indicator of the plurality of comparable properties sold with the ownership responsibility indicator of the property and assigning the value of the comparable property sold to the property whose value is being determined.

BRIEF DESCRIPTION OF THE DRAWINGS

The above, as well as other advantages of the present invention, will become readily apparent to those skilled in the art from the following detailed description of a preferred embodiment when considered in light of the accompanying drawings in which:

FIG. 5 shows an example of the method of FIG. 4;

FIG. 6 shows an example of the method of FIG. 2;

FIG. 7 shows another example of the method of FIG. 4.

DETAILED DESCRIPTION OF THE PREFERRED EMBODIMENT

Figure 1:
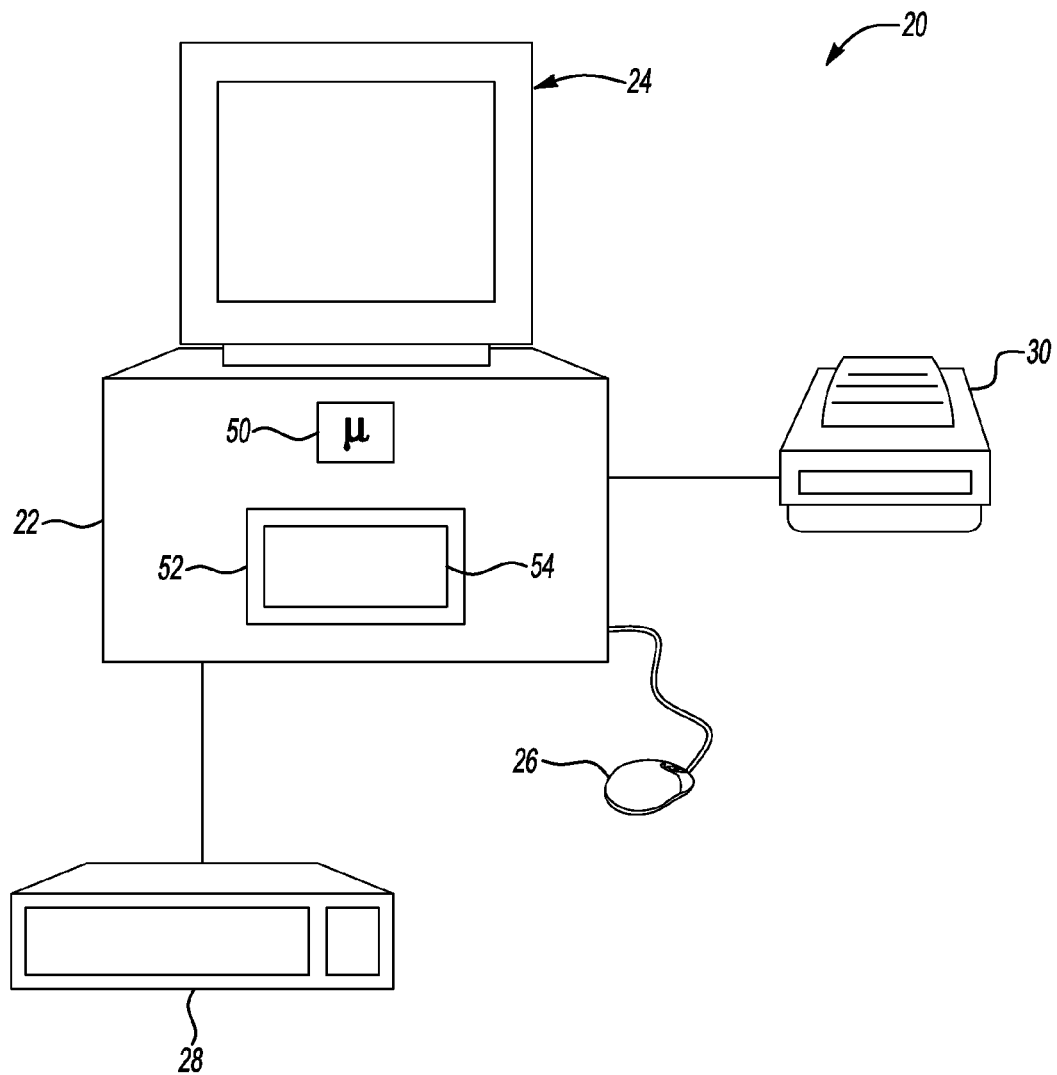
FIG. 1 is a schematic of a computer system of the present invention.

The present invention provides a computer system 20, as shown in FIG. 1, for determining a value of a property according to a method of the present invention. The computer system 20 includes a CPU 22 for creating an ownership responsibility indicator for the property and assigning a condition and/or value to the property in a manner which will be discussed below. The CPU 22 includes a display 24 and input devices, such as a mouse 26 and/or a keyboard 28. The CPU 22 is also connected to a printer 30.

The CPU 22 includes a microprocessor 50 accessing computer memory 52, such as a hard drive, RAM, CD ROM, ROM, etc. The computer memory 52 stores a database 54. The database 54 may include the following information: current and previous property owners' credit score, a valuation method, and property data, such as geographic region, lot size, style of structure, age of structure, date of sale, and living space. If the information is not stored on the database 54, the information may be manually entered by a user.

The microprocessor 50 of the CPU 22 is preprogrammed with suitable software to perform the functions described herein.

Figure 2:
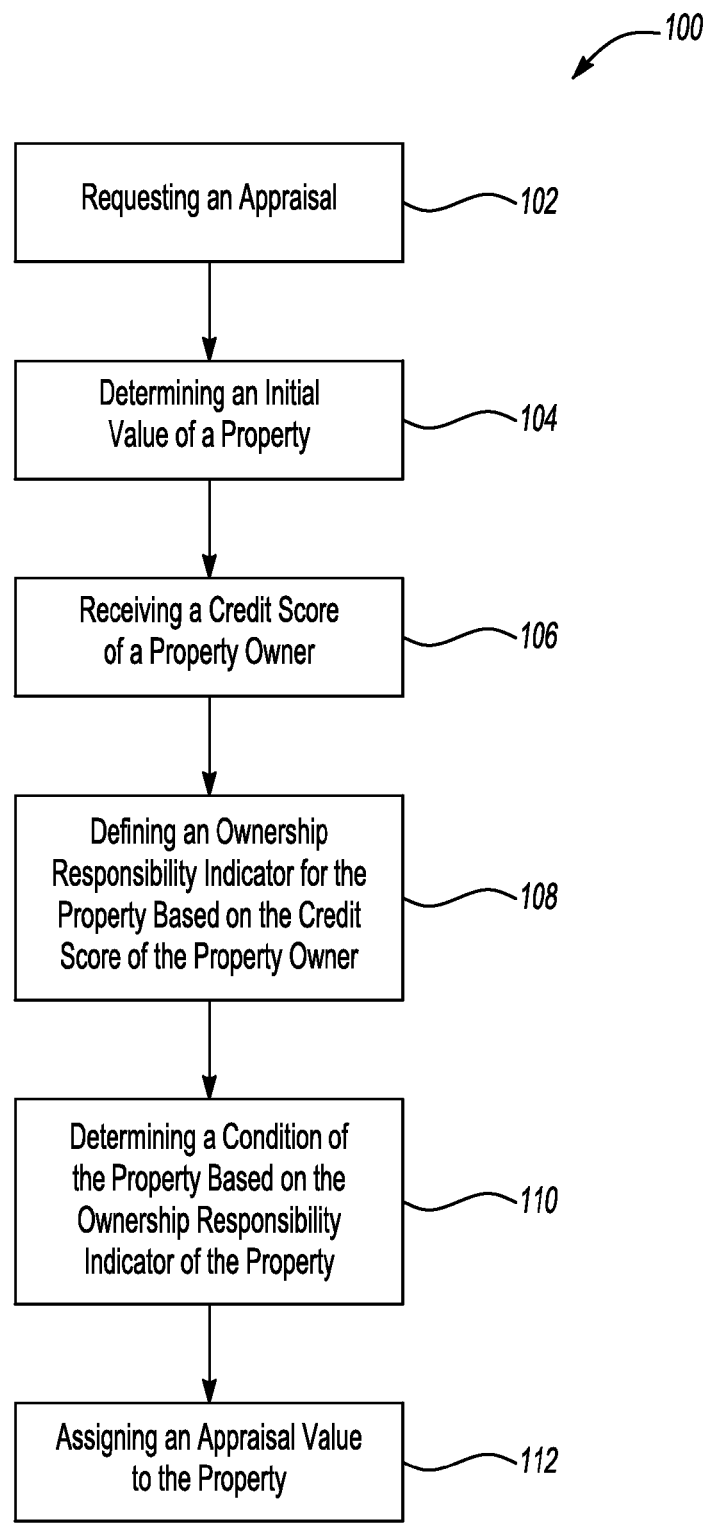
FIG. 2 shows the flow of an example method for appraising a value of a property.

An example method 100 for determining a value of a property is shown in FIG. 2. The method 100 includes receiving a request for an appraisal for the property (step 102). The request may originate from a mortgage lender, an insurance company, a borrower, or another concerned with the value and or condition of the property.

An initial value for the property is determined (step 104) by the CPU 22 accessing the valuation method from the database 54. The valuation method may include an automated valuation model (AVM), a drive by appraisal, a desk review, or another similar method that does not include a complete inspection to determine the initial value of the property. The initial value may include a range of values, a single value, or a single value within a range of values.

The CPU 22 accesses the database 54 to determine a credit score of the owner of the property (step 106). The credit score is preferably a FICO score, a Vantage score, or another score commonly known in the industry. Generally, the credit score of the owner (optionally including previous owners) is used as a proxy for the condition of the property. Thus, any known valuation method that incorporates condition of the property can be used with the present invention, by using the credit score as a proxy for the condition of the property. Some specific examples are described below, but the invention is not limited to the specific examples.

An ownership responsibility indicator (ORI) for the property is created by the CPU 22 based on the credit score of the owner of the property (step 108). The ORI is divided into at least two ranges based on the credit score of the owner of the property. For example, when using a FICO credit score, a score of 600-850 corresponds to a high ORI, and a score of 300-599 corresponds to a low ORI. Although a preferred range is given, one of ordinary skill in the art would recognize that further divisions in the scale could be made to increase its accuracy (i.e. there could be three ORI levels or a hundred ORI levels or the numerical credit score could be used directly as the ORI). Also, adjustments to the score ranges may be necessary to account for varying geographic regions.

Furthermore, the ORI may be modified to take into account not just the current credit score of the owner, but recent changes (or lack of recent changes) to the owner's credit score. For example, a significant recent drop in the owner's credit score may generate a low ORI for the property, possibly lower than if the owner had that low credit score consistently over time. Similarly, a consistently high credit score over a long period of time may lead to a high ORI for the property, possibly higher than an owner who has only achieved that high credit score recently.

The CPU 22 correlates the ORI for the property as described above with a condition of the property (step 110). A high ORI for the property indicates the property is being maintained an average to a good condition. A low ORI for the property indicates the property is being maintained at an average to a poor condition. Again, with just this information, any known valuation method could be used, simply substituting the ORI for the condition of the property.

An appraisal value for the property is calculated by the CPU 22 based on the ORI (step 112) and/or the condition determined by the ORI. The CPU 22 correlates the ORI and/or the condition determined by the ORI with a pricing factor. In one example, a high ORI for the property correlates to a price factor of approximately greater than or equal to one (e.g. 1.0 or 1.1) and a low ORI for the property correlates to a price factor of approximately less than or equal to one (e.g. 0.9 or 1.0). The CPU 22 multiplies the initial value, the initial range of values, the initial value within the value range, or the initial value and the value range by the price factor to calculate an appraisal value. The appraisal value is presented on the display 24, printed on paper by the printer 30, or sent to a database. Alternatively, a fixed amount may be added or subtracted from the initial value based upon the ORI, or the addition/subtraction could be scaled based upon the ORI value. Many other ways could be used to adjust the initial value based upon the ORI.

FIG. 6 illustrates examples of the method 100 described above. The CPU 22 generates appraised values, as shown in a chart 430. In this example, the chart 430 includes the following categories listed in a vertical column 434: Initial Value, ORI, Price Factor, and Appraisal Value. In the first appraisal example 438, the initial appraisal value was $80,000 and the ORI for the property was low. Although a low ORI corresponded to a price factor of 0.9 in this example, one of ordinary skill in the art would recognize that other price factors could be used to increase accuracy. The computer calculated the appraisal value for the property by multiplying the initial value $80,000 by the price factor 0.9 to generate the appraisal value of $72,000.

In the second appraisal example 440, the initial appraisal value was $150,000 with a range of values between $130,000 and $170,000. In this example, a high ORI corresponded to a price factor of 1.1. The computer calculated the appraisal value by multiplying the initial value $150,000 and the range of values $130,000 and $170,000 by the price factor 1.1 to generate the appraisal value of $165,000 within the range of values between $143,000 and $187,000.

In the third appraisal example 442, the initial appraisal value was $200,000 with a range of values between $170,000 and $230,000. In this example, the low ORI corresponded to a price factor of 0.9. The computer calculated the appraisal value by multiplying the initial value $200,000 by the price factor 0.9 to generate the appraisal value of $180,000 within the range of values between $170,000 and $230,000 (i.e. the range is not modified).

In the fourth appraisal example 444, the initial value included a range of values between $140,000 and $160,000. In this example, the low ORI corresponded to a price factor of 0.9. The computer calculated the appraisal value by multiplying the initial value range $140,000 to $160,000 by the price factor 0.9 to generate the appraisal value between $126,000 and $144,000.

In the fifth appraisal example 446, the initial appraisal value was $120,000. In this example, a high ORI corresponded to a price factor of 1.05 to 1.1. The computer calculated the appraisal value by multiplying the initial value $120,000 by the price factor 1.05 to 1.1 to generate the appraisal value of $126,000 and $132,000.

Figure 3:
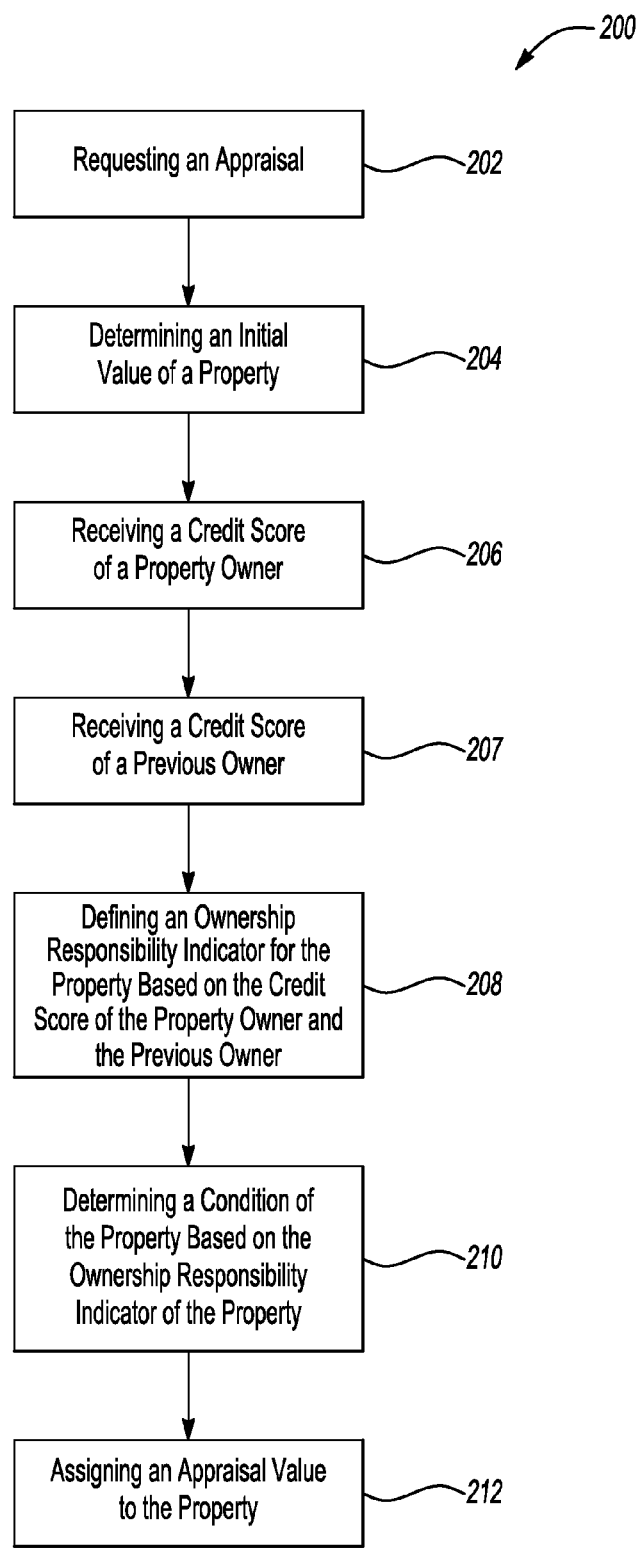
FIG. 3 shows the flow of another example method for appraising a value of a property.

As shown in FIG. 3, a second example method 200 for determining a value of a property is generally the same as the method 100 described above except as otherwise described below or shown in FIG. 3. The CPU 22 obtains a credit score of at least one previous owner of the property (step 207) from the database 54. The CPU 22 determines an ownership responsibility indicator for the property based on the credit score of the owner of the property and the credit score of the at least one previous owner of the property (step 208). For example, the credit score of the previous owner could be averaged with the credit score of the current owner. Optionally, the credit scores of the previous owner and the current owner could be weighted based upon their respective times of ownership. Eventually, the credit score of the previous owner would be ignored if the current owner has been the owner for a sufficient length of time (e.g. four years). The CPU 22 then determines the condition of the property based upon the combined ORI (step 210) in any of the ways described above. The CPU 22 then calculates an appraised value of the property in any of the ways described above (or any known technique, using the ORI as a substitute for condition) based upon the ORI (step 212).

Figure 4:
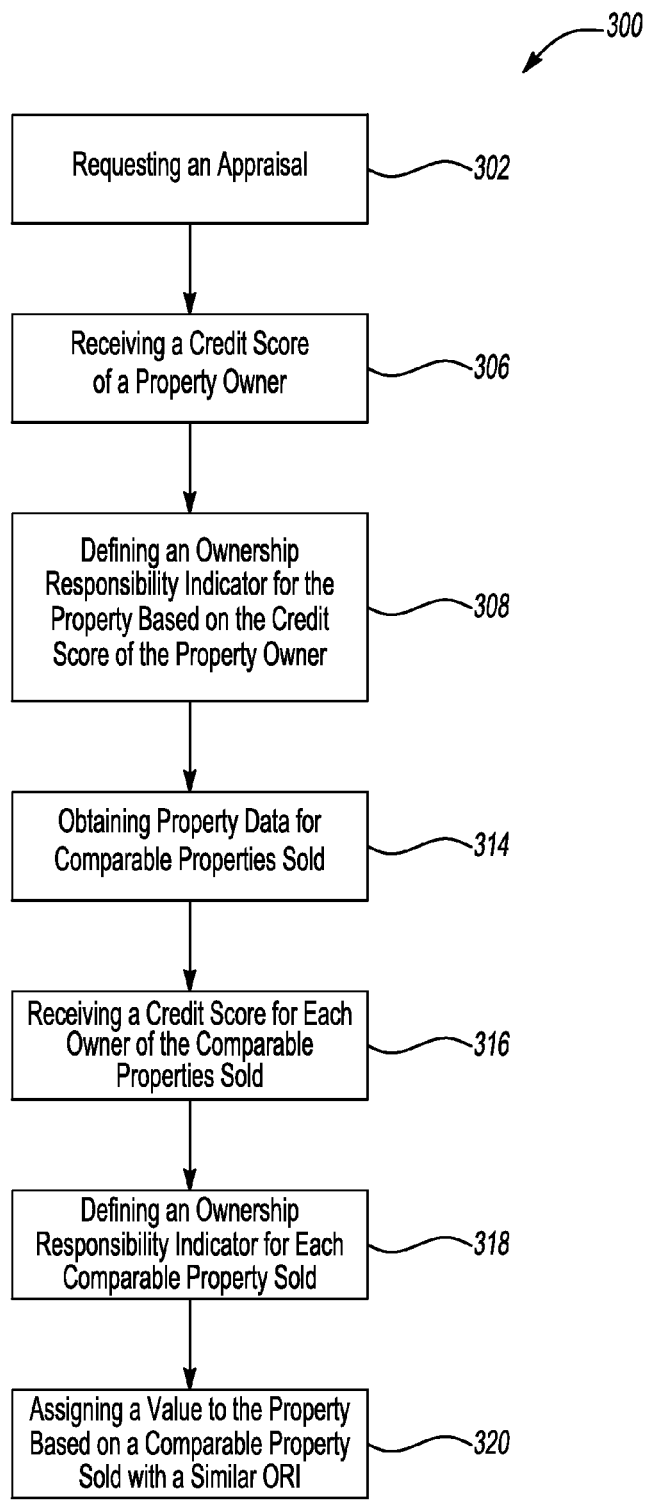
FIG. 4 shows the flow of another example method for appraising a value of a property.

As shown in FIG. 4, a third example method 300 for determining a value of a property is generally the same as the method 100 described above except as otherwise described below or shown in FIG. 5. The CPU 22 obtains property data for a plurality of comparable properties sold (step 314) from the database 54. The property data includes at least two of the following: geographic region, lot size, style of structure, age of structure, date of sale, and living space. The CPU 22 obtains a credit score for each owner of the plurality of comparable properties sold (step 316) from the database 54.

The CPU 22 assigns an ORI to the plurality of comparable properties sold based on the credit score of each owner of the comparable property (step 318). The CPU 22 then assigns an appraisal value to the property based on matching the ORI of the property with the ORI of the comparable property sold and assigning the value of the comparable property sold with a matching ORI as the appraisal value of the property.

FIG. 5 is an example of the method 300 described above. Data available to the CPU 22 is shown in chart 330. A plurality of property data categories 332 are displayed on the chart 330 on a vertical axis 334. A subject appraisal property 338 and a plurality of comparable properties sold 340 are shown on a horizontal axis 336 of the chart 330. By matching an ORI of the subject property with an ORI of the comparable properties sold 340 from the chart 330, the CPU 22 determines the value of the subject property 338. As shown on the chart 330, the subject property value 342 would be $110,000 for this example.

FIG. 7 illustrates another example method of determining an appraisal value based on a plurality of comparable properties sold. The example method of FIG. 7 is similar to the method described in FIG. 4 and FIG. 5 except where shown in FIG. 7 or described below. The data available to the CPU 22 is shown in chart 530. A plurality of property data categories 532 are displayed on the chart 530 on the vertical axis 534. A subject appraisal property 538 and a plurality of comparable properties sold 540 are shown on a horizontal axis 536 on the chart 530. The CPU accesses the database 54 to determine the price adjustments in comparison to the subject property 538 for each of the data categories 532 in a manner similar to the commonly-used technique. The CPU 22 calculates an adjusted price 542 for each of the comparable properties 540 by summing the sale price with any price adjustments to the property data categories 532 in a manner similar to the commonly-used technique.

The subject property value can be based on the adjusted price based on all of the comparable properties 540 as modified based upon their relative ORIs and the ORI of the subject property as shown, which would generate a price range of $252,500 to 277,500. For example, if the subject property has a "high" ORI and the comparable has a "low" ORI, the discrepancy would be treated as a difference in condition, i.e. an addition to the price of the comparable. The amount of the adjustment would depend upon the difference in ORI (depending upon the number of ORI levels provided), the relative magnitudes of the values involved and optionally geographic considerations.

Alternatively, the subject property appraised value may be calculated based only upon comparable properties having a similar ORI (in this case "high"). In that case, the subject property value would be $262,500 to $277,500. In other words, the known technique for calculating an appraised value of the subject property can be performed in the normal, known way, but by only selecting comparables with the same (or similar) ORI.

Additionally, the ORI can be substituted for the condition of a property in any other known appraisal method.

Investment banks package a mortgage backed security (MBS) to sell to investors. A rating is assigned to the MBS by agencies such as the Standard and Poors or Fitch. One of the most important factors in assigning the rating to the MBS is an analysis of the collateral. Currently, the analysis is performed with an AVM. Current AVMs consider a plurality of comparable properties sold and discard comparable properties sold with values substantially higher or lower than a median or mode value of the plurality of comparable properties sold. However, by considering the ORI of the plurality of comparable properties sold in connection with the AVM, the determined value of the property will be more indicative of the value of the property, even though the determined value may be substantially higher or lower than the median or mode value of the plurality of comparable properties sold.

Considering the ORI of the property owner is helpful in analyzing collateral in a transitional neighborhood where the property is being renovated or updated. With many properties foreclosed, abandoned, or dilapidated, the median or mode value of the plurality of comparable properties sold may be low. However, current AVMs may consider the plurality of comparable properties sold that were either renovated or updated as an anomaly and an irrelevant comparable property. By comparing the ORI of the plurality of comparable properties sold with the ORI of the subject property, a more accurate value may be assigned to the subject property that may be either substantially higher or lower than the median or mode of the plurality of comparable properties sold.

Considering the ORI of the property owner is also useful in analyzing collateral in previously stable urban areas with historically few foreclosures. For example, a loan on a property where the ORI indicates likely foreclosure will not be assigned a value similar to a typical arms length transaction with standard marketing times and conditions. In this case, the property will be assigned a value closer to other foreclosed properties in the area.

As the property used for collateral for the MBS changes ownership, the ORI of the new owner may be used to determine the value of the property as well as determine any change in the value of the collateral. Moreover, this could reduce the effect of redlining because the appraisal of the home will be compared to homes with owners with similar credit scores, which might mean a comparison with homes that are farther away, and less comparison with some nearby homes with different credit scores.

It is also possible that scores other than credit scores could be used as a proxy for property condition. For example, insurance scores or other objective information about the owner of the property (and previous owner and the owners of comparables) could be used in any of the above-described methods.

Although a preferred embodiment has been disclosed, a worker of ordinary skill in this art would recognize that certain modifications would come within the scope of this invention. For that reason, the following claims should be studied to determine the true scope and content of this invention.

What is claimed is:

1. A method, comprising:
receiving, by a computing system including at least one processor, a request for an appraisal of a property;
determining, by the computing system, an initial value for the property;
receiving, by the computing system, a credit score of an owner of the property from at least one data store;
receiving, by the computing system, at least one other credit score of at least one previous owner of the property from the at least one data store; and
calculating, by the computing system, an appraised value for the property based on the credit score of the owner, the at least one other credit score of the at least one previous owner, and the initial value for the property.

2. The method of claim 1, further comprising:
determining, by the computing system, an ownership responsibility indicator based upon the credit score of the owner and the at least one other credit score of the at least one previous owner.

3. The method of claim 2, further comprising:
assigning, by the computing system, the ownership responsibility indicator to the property in direct correlation with the credit score of the owner.

4. The method of claim 3, further comprising:
multiplying, by the computing system, the initial value by a first price factor greater than a second price factor applied in response to the credit score of the owner meeting a predefined criterion.

5. The method of claim 2, further comprising:
dividing, by the computing system, the ownership responsibility indicator into at least two ranges of ownership responsibility values.

6. The method of claim 2, wherein the determining the ownership responsibility indicator further comprises:

decreasing, by the computing system, the ownership responsibility indicator in response to the credit score of the owner decreasing.

7. The method of claim 6, further comprising:
multiplying, by the computing system, the initial value by a first price factor less than a second price factor applied in response to the credit score of the owner being less than a predefined credit score.

8. The method of claim 2, wherein the determining the ownership responsibility indicator further comprises:
decreasing, by the computing system, the ownership responsibility indicator in response to a drop in the credit score of the owner meeting a predefined criterion.

9. The method of claim 2, further comprising:
assigning, by the computing system, a condition for the property based on the ownership responsibility indicator.

10. The method of claim 1, further comprising:
assigning, by the computing system, a condition for the property based upon the credit score of the owner and the at least one other credit score of the at least one previous owner.

11. The method of claim 1, further comprising:
receiving, by the computing system, a credit score of an owner of a comparable property including at least one property characteristic that is same or similar to a property characteristic of the property.

12. The method of claim 11, wherein the comparable property is determined by at least two of the following: geographic region, lot size, style of structure, age of structure, date of sale, and living space.

13. The method of claim 1, further comprising:
receiving, by the computing system, property data for a plurality of comparable properties sold, wherein the plurality of comparable properties include respective property characteristics that are same or similar to one or more property characteristics of the property;
receiving, by the computing system, respective credit scores for respective owners of the plurality of comparable properties sold;
defining, by the computing system, respective ownership responsibility indicators for the plurality of comparable properties sold based on the respective credit scores for the respective owners of the plurality of comparable properties sold; and
determining, by the computing system, the appraised value for the property based on an adjusted value of the plurality of comparable properties sold determined as a function of the respective ownership responsibility indicators for the plurality of comparable properties sold.

14. The method of claim 1, wherein the determining, by the computing system, the initial value for the property includes applying a valuation model.

15. The method of claim 1, wherein the credit score of the owner and the at least one other credit score of the at least one previous owner are at least one of at least one Fair Isaac Corporation (FICO) score or at least one Vantage score.

16. A computer-readable storage medium having computer-executable instruction stored thereon that, in response to execution, cause a computing system to perform operations, comprising:
receiving a request for an appraisal of a property;
determining an initial value for the property;
receiving a credit score of an owner of the property from at least one data store;
receiving at least one other credit score of at least one previous owner of the property from the at least one data store;
defining an ownership responsibility indicator for the property based on the credit score of the owner of the property and the at least one other credit score of the at least one previous owner of the property;
associating the ownership responsibility indicator of the property with a condition of the property; and
calculating a value for the property based on the ownership responsibility indicator and the initial value for the property.

17. The computer-readable storage medium of claim 16, the operations further comprising:
increasing the ownership responsibility indicator for the property in response to the credit score of the owner of the property increasing.

18. The computer-readable storage medium of claim 16, the operations further comprising:
decreasing the ownership responsibility indicator for the property in response to the credit score of the owner of the property decreasing.

19. A system, comprising:
means for receiving, by a computing system including at least one processor, a request for an appraisal of a property;
means for determining, by the computing system, an initial value for the property;
means for receiving, by the computing system, a credit score of an owner of a property from at least one data store;
means for receiving, by the computing system, at least one other credit score of at least one previous owner of the property from the at least one data store; and
means for calculating, by the computing system, a value for the property based on the credit score of the owner, the at least one other credit score of the at least one previous owner, and the initial value for the property.

20. The system of claim 19, further comprising means for determining, by the computing system, an ownership responsibility indicator based upon the credit score of the owner and the at least one other credit score of the at least one previous owner.

* * * * *